United States Patent [19]

Louzil et al.

[11] 3,999,446
[45] Dec. 28, 1976

[54] RECORDING AND/OR PLAYBACK APPARATUS

[75] Inventors: Friedrich Louzil; Anton Müller, both of Vienna, Austria

[73] Assignee: U.S. Philips Corporation, New York, N.Y.

[22] Filed: May 2, 1975

[21] Appl. No.: 573,948

Related U.S. Application Data

[63] Continuation of Ser. No. 360,774, May 16, 1973, abandoned.

[30] Foreign Application Priority Data

May 27, 1972 Germany ............... 7219954[U]

[52] U.S. Cl. .................... 74/527; 360/62; 74/473 R
[51] Int. Cl.² ............ B60K 20/00; G05G 5/06
[58] Field of Search .......... 74/527, 473 R, 483 PB; 292/57, 58, 64, 150; 360/61, 62, 60, 137; 200/42 T, 157, 318, 321, 333, 334

[56] References Cited

UNITED STATES PATENTS

| | | | |
|---|---|---|---|
| 3,583,184 | 6/1971 | Papale | 74/473 R X |
| 3,628,257 | 12/1971 | Budrose | 360/62 X |

*Primary Examiner*—Samuel Scott
*Assistant Examiner*—Frank H. McKenzie, Jr.
*Attorney, Agent, or Firm*—Frank R. Trifari; David R. Treacy

[57] ABSTRACT

A latching control for a recording and/or playback apparatus. To switch on an apparatus function said control is moved in a first direction said control being lockable by moving at least part of the control in a second direction perpendicular to the first direction.

3 Claims, 5 Drawing Figures

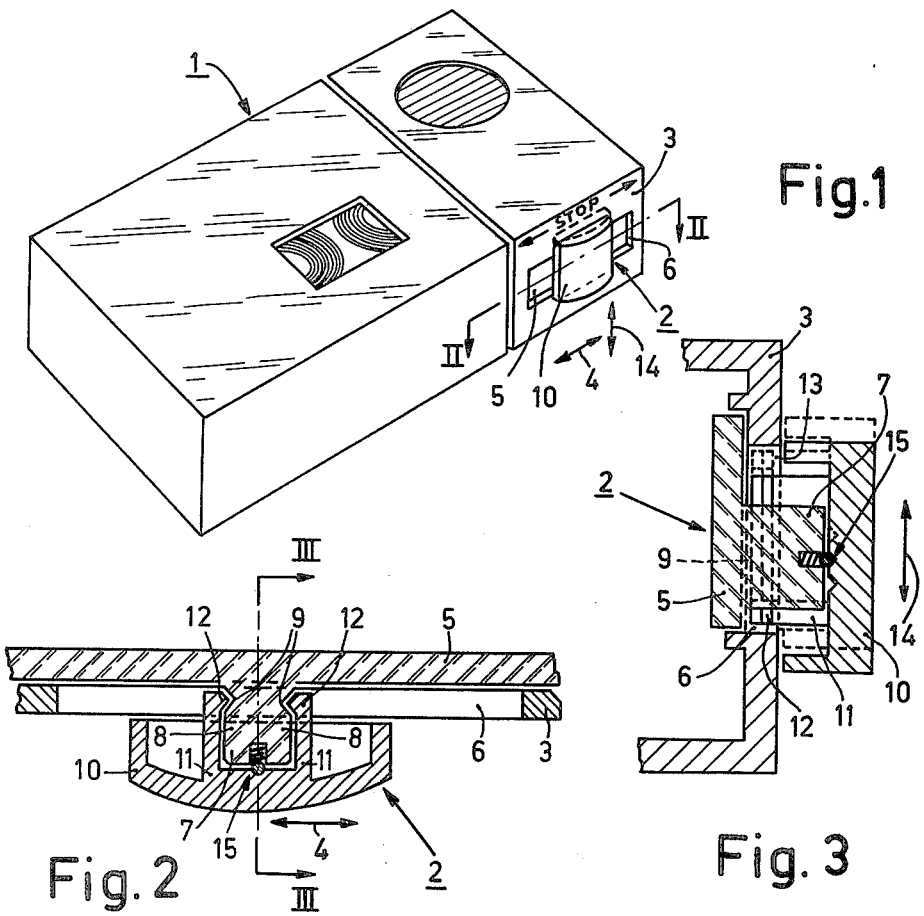
Fig. 1
Fig. 3
Fig. 2
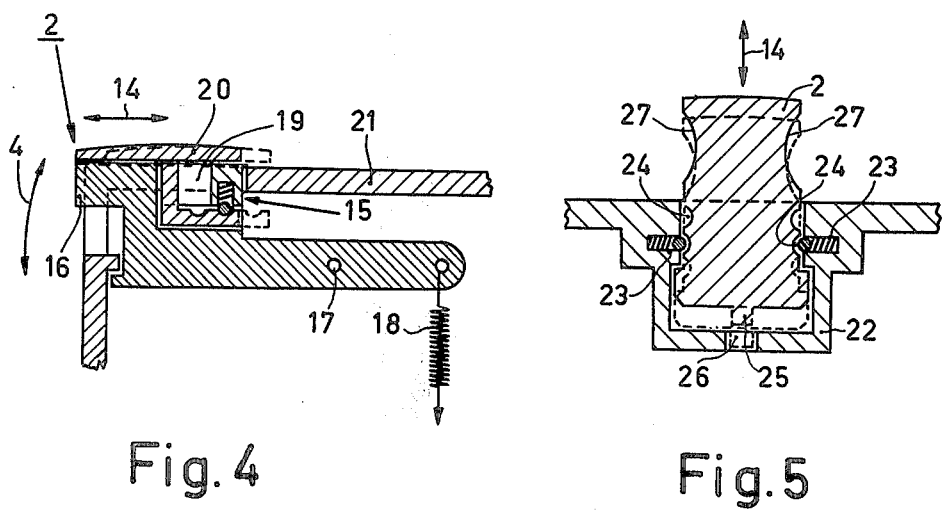
Fig. 4
Fig. 5

RECORDING AND/OR PLAYBACK APPARATUS

This is a continuation of application Ser. No. 360,774, filed May 16, 1973, now abandoned.

The invention relates to a recording and/or playback apparatus, specifically a pocket apparatus, which for switching on at least one transport and/or operational mode comprises at least one control which is movable in one direction. In such apparatus a control may inadvertently be actuated, especially when a small apparatus is concerned which is to be carried about in a briefcase, coat pocket etc. If such inadvertent actuation is not noticed by the user of the apparatus, this may lead to damaging of the apparatus or the record carrier, or battery drainage if a battery-operated apparatus is concerned.

According to the invention these problems are obviated in a simple manner in that at least part of the control is additionally movable in a second direction which substantially perpendicular to the first direction, upon which movement the control is locked so as to exclude displacement in the first direction. It is obvious that in this way the user of an apparatus of such a design can optionally lock a control so that this cannot be actuated inadvertently. The operation to be carried out by the user of the apparatus is simple and convenient, because it can be performed with one hand and directly at the control to be locked.

An extremely simple construction is obtained when on the control which is movable in the first direction a catch is mounted which is movable in the second direction. In this way the entire control need not be moved in the case of locking, which is advantageous for constructional reasons in view of the parts of the apparatus which cooperate with a control.

In principle, a locking facility as described hereinbefore can be provided in any arbitrary position of said control. However, in practice it proves to be very important when the control can only be locked in the rest position.

The invention is described in more detail, by way of example, with reference to the drawing, which shows some embodiments, to which the invention is not limited however.

FIG. 1 is a perspective view of a recording and/or playback apparatus with a control according to the invention for switching on the transport mode STOP, FORWARD and REVERSE of the record carrier.

FIG. 2 is a longitudinal section of the control of FIG. 1.

FIG. 3 is a sectional view of the control of FIG. 1 taken on the line III—III in FIG. 2.

FIG. 4 shows an embodiment of a control in the form of a hinged push-button.

FIG. 5 shows an embodiment of a control which as a whole can be moved in two directions.

Reference numeral 1 in FIG. 1 refers to a recording and/or playback apparatus comprising a sliding control 2, by means of which the transport modes of a record carrier can be switched on. FIG. 1 shows the control in the STOP position. The control can be moved out of this position into two positions in which the forward and the reverse movement, respectively, of the record carrier is switched on. The control is moved in the longitudinal direction of the narrow side 3 of the apparatus. This direction is indicated by the double arrow 4 and is referred to as first direction hereinafter.

As can be seen in FIGS. 2 and 3, the control 2 consists of a base 5 provided with a projection 7 which extends through an opening 6 in the narrow side 3 of the apparatus. The lateral surfaces 8 of projection 7, which extend perpendicular to the first direction, are provided with guide notches 9 which extend also at right angles to the first direction and moreover parallel to the narrow side 3. On this projection 7 a catch 10 is arranged so as to be movable along the notches 9. For this purpose the catch 10 is provided with U-shaped projections 11, which carry guide ribs 12 which are associated with and engage in the notches 9. The projections 11 on the catch extend into the opening 6 in the narrow side 3. When the control 2 is in the STOP position, the projections 11 are located in front of a lateral recess 13 of the opening 6, so that in this position of the control the catch 10 is movable in a direction perpendicular to the first direction, as is indicated in FIGS. 1 and 3 by the double arrow 14, and which direction is referred to as the second direction. A snapping device 15 which acts between the catch 10 and the projection 7 defines two positions of the catch, the catch being clear of the recess 13 in one position, its rest position, and engaging in the recess in the other position, the locked position. In the first case the control 2 is movable in the first direction, which is not possible in the second case, because the recess 13 prevents the catch 10, and thus the control 2, from being moved in the first direction.

When the catch 10 is in its rest position, the control 2 can be brought from one operating position into the other during its movement in the first direction. As soon as the control 2 has left the STOP position, the projections 11 on the catch 10 are guided sideways with some clearance by the longitudinal edges of the opening 6, so that the catch 10 can no longer be moved in the second direction. Consequently, the control 2 can only be locked in the STOP position by simply moving the catch 10 sideways, i.e. by moving it in the second direction, thus preventing inadvertent actuation of the apparatus. The locked position of the catch is shown by the broken line in FIGS. 1 and 3. As can be seen, the movement of the control and of the catch is very simple and can be performed with one finger. It is obvious that, if desired, the control can also be adapted so as to permit locking in the two other operating positions, i.e. not only in the rest position, for which purpose the opening 6 should also be provided with corresponding lateral recesses at the points at which the projections 11 of the catch 10 of the control are then located.

FIG. 4 shows a control in the form of a push-button 16, which can be pivoted about a spindle 17 against the action of a spring 18. The direction of pivoting, is in this case the first direction, in which the control can be moved and is again indicated by a double arrow 4. A catch 20 is movably arranged in a slot 19 in the push-button. The direction in which the catch can be moved, i.e. the second direction of movement for the control as a whole, is indicated by the double arrow 14. It extends substantially perpendicular to the first direction. A snapping device 15 again defines the two positions of the catch. FIG. 4 shows the rest position of the catch in which the control can be freely moved in the first direction 4. When the catch is brought into the second position, defined by the snapping device, its handle part extends over the housing 21 of the apparatus, as is indicated by the broken line in FIG. 4. As can be seen, the control is then no longer movable in the first direction 4. Thus, in this embodiment in advertent actuation can also prevented by a simple displacement of a part of the control.

The sliding control 2 according to FIG. 5 consists of a single member, which is movable in two directions which are perpendicular to each other. FIG. 5 shows the non-locked position of the control, in which for switching on various modes of operation of the apparatus a control is movable in the first direction, which in this case extends perpendicular to the drawing plane. Guidance of the control is effected with the aid of a U-shaped bracket 22 in conjunction with several spring biassed balls 23, which engage in longitudinal grooves 24 in the control. At the side of the control 2 which faces the bottom surface of the bracket 22 a projection 25 has been provided, for which in accordance with the various switching positions of the control corresponding openings 26 have been formed in the bottom surface of the bracket. In this way the control can be locked in any switching position, in that it is moved towards the bottom surface of the bracket upon exertion of pressure, the projection 25 engaging in the corresponding opening 26. This second direction of movement of the control is again indicated by the double arrow 14. The balls 23 also define the position of the control in the locked position. To unlock the control it can be gripped at the laterally arranged grips 27 and withdrawn from the bottom surface of the bracket until it again is engaged by a ball, after which it is movable again in the first direction.

It is to be noted that in all the embodiments those parts of the apparatus which cooperate with the control are not shown for simplicity, because they do not directly relate to the invention.

What is claimed is:

1. A latching control for a recording and/or playback apparatus, comprising a first member; means for mounting said first member to permit manual movement in a first direction between a first position and a second position, and in a latching direction perpendicular to said first direction between said first position and a locking position; a second member; means for moving said second member in response to movement of said first member in said first direction only and for preventing movement of said second member in response to movement of said first member in said latching direction; means for controlling an operational function of the apparatus in response to the position of the second member, the apparatus being turned off when the second member is in a position corresponding to the first and locking positions of said first member, said operational function being enabled when the second member is in a position corresponding to the second position of the first member; and biasing means for holding said first member in said locking position to prevent inadvertent movement of said first member.

2. A latching control as claimed in claim 1 wherein said first member comprises a catch mounted on said second member for slidable movement with respect to said second member between said first and locking positions.

3. A latching control as claimed in claim 2, wherein said biasing means comprises a spring-loaded detent and also detent means for holding said first member in said first position.

* * * * *